United States Patent
Brunner

(10) Patent No.: US 11,970,179 B2
(45) Date of Patent: Apr. 30, 2024

(54) TURN SIGNAL CANCELATION SYSTEMS AND METHODS FOR TWO-WHEELED VEHICLES

(71) Applicant: Zero Motorcycles, Inc., Scotts Valley, CA (US)

(72) Inventor: Will M. Brunner, Scotts Valley, CA (US)

(73) Assignee: ZERO MOTORCYCLES, INC., Scotts Valley, CA (US)

( * ) Notice: Subject to any disclaimer, the term of this patent is extended or adjusted under 35 U.S.C. 154(b) by 0 days.

(21) Appl. No.: 17/489,211

(22) Filed: Sep. 29, 2021

(65) Prior Publication Data

US 2023/0101567 A1      Mar. 30, 2023

(51) Int. Cl.
*B60W 50/06*      (2006.01)
*B60Q 1/34*      (2006.01)
*B60W 50/00*      (2006.01)

(52) U.S. Cl.
CPC .............. *B60W 50/06* (2013.01); *B60Q 1/34* (2013.01); *B60W 2050/0075* (2013.01); *B60W 2300/36* (2013.01); *B60W 2520/14* (2013.01)

(58) Field of Classification Search
CPC ......... B60W 50/06; B60W 2050/0075; B60W 2300/36; B60W 2520/14; B60Q 1/34
See application file for complete search history.

(56) References Cited

U.S. PATENT DOCUMENTS

| | | | |
|---|---|---|---|
| 4,030,066 | A | 6/1977 | White |
| 4,060,847 | A | 11/1977 | Penrod |
| 4,333,071 | A | 6/1982 | Kira et al. |

(Continued)

FOREIGN PATENT DOCUMENTS

| | | |
|---|---|---|
| CN | 107161075 B | 9/2020 |
| DE | 102005050841 A1 | 5/2007 |

(Continued)

OTHER PUBLICATIONS

Tsantilas, S. "Smart Turn System Senses Correct Time to Cancel Motorcycle Turn Signals" https://newatlas.com/self-canceling-smart-turn-system/41584/ (Jan. 30, 2016) pp. 1-12.

(Continued)

*Primary Examiner* — Aniss Chad
*Assistant Examiner* — Stephanie T Su
(74) *Attorney, Agent, or Firm* — Carter, DeLuca & Farrell LLP

(57) ABSTRACT

In a turn signal cancelation system for a two-wheeled vehicle, a controller is adapted to automatically cancel the turn signal of the vehicle upon: (a) a determined distance traveled by the vehicle after an occurrence of the predetermined operation of the vehicle exceeding a first distance threshold and a determined yaw angle traversed by the vehicle after the occurrence of the predetermined operation of the vehicle exceeding a yaw angle threshold; and (b) the determined distance traveled by the vehicle after the occurrence of the predetermined operation of the vehicle exceeding a second distance threshold, different from the first distance threshold, independent of the determined yaw angle traversed by the vehicle after the occurrence of the predetermined operation of the vehicle.

21 Claims, 7 Drawing Sheets

(56) References Cited

U.S. PATENT DOCUMENTS

| | | |
|---|---|---|
| 4,403,211 A | 9/1983 | Shibata et al. |
| 4,638,290 A | 1/1987 | Wagner |
| 4,660,020 A | 4/1987 | Miyamaru et al. |
| 4,792,785 A | 12/1988 | Yukio et al. |
| 4,859,816 A | 8/1989 | Tanaka |
| 4,962,366 A | 10/1990 | Hatanaka et al. |
| 5,773,776 A | 6/1998 | Uleski et al. |
| 5,936,215 A | 8/1999 | Masuda et al. |
| 6,204,759 B1 | 3/2001 | Jahnke |
| 7,102,500 B2 | 9/2006 | Martin et al. |
| 7,173,524 B2 | 2/2007 | Ponziani |
| 7,408,455 B2 | 8/2008 | Ponziani |
| 7,783,399 B1 | 8/2010 | Young et al. |
| 8,242,898 B2 | 8/2012 | Ieda et al. |
| 9,002,577 B2 | 4/2015 | Tetsuka et al. |
| 9,132,771 B2 | 9/2015 | Tetsuka et al. |
| 9,302,613 B2 | 4/2016 | Raubvogel |
| 9,457,971 B2 | 10/2016 | Bonefas et al. |
| 9,517,718 B2 | 12/2016 | Raubvogel |
| 10,618,513 B2 | 4/2020 | Suzuki et al. |
| 10,953,882 B2 | 3/2021 | Fujii |
| 2002/0024434 A1 | 2/2002 | Okuda et al. |
| 2004/0100373 A1* | 5/2004 | Ponziani ............... B60Q 1/346 340/476 |
| 2009/0069977 A1 | 3/2009 | Markyvech |
| 2010/0156621 A1* | 6/2010 | Nishimura ............... B60Q 1/42 340/476 |
| 2010/0308988 A1* | 12/2010 | Ieda ............... B60Q 1/40 340/477 |
| 2012/0229268 A1 | 9/2012 | Butlin, Jr. et al. |
| 2014/0240119 A1* | 8/2014 | Tetsuka ............... B60Q 1/40 340/476 |
| 2018/0088583 A1 | 3/2018 | Wang et al. |
| 2020/0207342 A1* | 7/2020 | Hsu ............... B60W 50/0097 |

FOREIGN PATENT DOCUMENTS

| | | |
|---|---|---|
| DE | 102008011940 A1 | 9/2009 |
| DE | 102016204336 A1 | 9/2017 |
| JP | 10826157 A | 1/1996 |
| JP | 2003252112 A | 9/2003 |
| JP | 2011207360 A | 10/2011 |
| JP | 2018020663 A | 2/2018 |
| JP | 6610801 B2 | 12/2019 |
| WO | 2008012836 A2 | 1/2008 |
| WO | 2013068171 A1 | 5/2013 |
| WO | 201513964 A1 | 9/2015 |

OTHER PUBLICATIONS

"TVS Apache RR 310" TVS Apache RR 310 Owner's Manual, https://www.tvsapache.com/pdf/Manuals-Apache-RR-310.pdf (Aug. 2018) pp. 1-144.

"FTR 1200 TM Owner's Manual" Indian Motorcycle Inc. (2019) pp. 1-166, BE Legendary.

"Tiger 900, Tiger 900 GT, Tiger 900 GT Pro, Tiger 900 Gt (LRH), Tiger 900 Rally and Tiger 900 Rally Pro" Triumph Owner's Handbook (Dec. 2019) pp. 1-204, relevant pp. 28-29.

Bapst, N. et al., "Bicycle Automated Turn Signal (BATSignal)" Final Report—ECE 445, Fall 2016 (Jul. 2016) pp. 1-23.

International Search Report and Written Opinion issued in corresponding International Application No. PCT/US22/44088, dated Feb. 28, 2023, pp. 1-11.

\* cited by examiner

TURN SIGNAL CANCELATION SYSTEMS AND METHODS FOR TWO-WHEELED VEHICLES

FIELD OF THE INVENTION

The present application relates to turn signal cancelation systems and methods for two-wheeled vehicles.

BACKGROUND INFORMATION

Motor vehicles, including automobiles, trucks, motorcycles, etc., include turn signals to indicate the driver's intent, for example, to turn from one street to another at an intersection, to change lanes on a multilane road, or to otherwise indicate turning or lateral movement behavior. Activating a turn signal allows one driver to alert pedestrians and other drivers to an upcoming turn or lane change. Failure to cancel the turn signal, either manually or automatically, after the turn or lane change can lead to uncertainty and confusion as to the driver's intended operation of their vehicle. Therefore, improper operation of a turn signal can lead to dangerous conditions for both pedestrians and other vehicle operators.

Many vehicles include automatic turn signal cancelation devices. In four-wheeled vehicles, such as automobiles, a turn signal may automatically be canceled by a mechanical mechanism located in the turn signal stalk or steering column. For example, a cam mechanism is provided to return the turn signal stalk to its neutral position after being activated to indicate the driver's intent to make a turn at an intersection. Once the turn signal is activated and after the steering wheel is turned by a predetermined angle in the direction of the turn, returning the steering wheel toward the straight driving position activates the cam mechanism to thereby return the turn signal stalk to its neutral position and cancel the turn signal. Such a cam mechanism is ineffective in canceling a turn signal that is activated to indicate a lane change. This is because the steering wheel is not turned by a sufficient angle to engage the cam mechanism.

More sophisticated turn signal cancelation devices involve timers, distance measurement devices, gyros, etc. For example, U.S. Pat. No. 4,333,071 describes a self-canceling apparatus for vehicle turn indicators, in which the turn angle of the steering column is detected by a steering angle sensor mounted intermediate in the rotating front fork assembly of a motorcycle and the stationary collar of the steering column. According to the '071 patent, the turn signal cancelation circuit cancels a turn indication only when: (1) the turn detection circuit indicates that the minimum steering angle change has been made in the direction commanded; (2) minimum distance requirements have been exceeded and are indicated by a distance detection circuit; (3) minimum velocity requirements have been exceeded as indicated by a velocity detection circuit; and (4) the turn detection circuit indicates that steering angle displacement is less than minimum steering angle representing termination of the turn.

U.S. Pat. No. 4,962,366 describes an automatic turn signal cancelation apparatus for a motorized cycle, in which a signal provided from a handlebar turning angle detector is accumulated in response to a signal provided from a travel distance detector.

U.S. Pat. No. 7,408,455 describes a turn signal control system for turning on and off left and right hand turn signals in a vehicle. If the velocity of the vehicle is greater than 15 mph, the turn signal is canceled if the distance traveled by the vehicle is greater than a distance threshold value; if the velocity of the vehicle is less than 15 mph, the turn signal is canceled if the yaw angle of the vehicle is greater than a yaw angle threshold or the distance traveled is greater than the distance threshold.

U.S. Pat. No. 8,242,898 describes a turn signal illumination controller that monitors the lateral movement distance of a vehicle from when a turn switch lever is operated as to illuminate a turn signal indicator. When the lateral movement distance is greater than or equal to a threshold value indicating completion of lane changing, the turn signal illumination controller cancels the turn signal indicator.

In two-wheeled vehicles, automatic turn signal cancelation faces certain challenges that are not present in four-wheeled vehicles. For example, in four-wheeled vehicles, e.g., automobiles, or other vehicle having a steering wheel, making a turn, e.g., at an intersection, may involve turning the steering wheel by a significant amount, e.g., in excess of 90°, or by at least one full revolution of the steering wheel. In contrast, in two-wheeled vehicles, making a turn involves significantly less angular turning of the handlebars. For example, unlike steering in automobiles, which merely involves turning the steering wheel, steering in two-wheeled vehicles involves both turning of the handlebars to turn the front wheel and leaning by the driver. Accordingly, the turn angle of the handlebars may not be a reliable indicator of initiating the turn and may not be great enough that the return of the handlebars and front wheels to the neutral, straight-forward driving position indicates completion of the turn such that the turn signal should be deactivated or canceled. Automatic turn signal cancelation in two-wheeled vehicles is made even more difficult when considering that operating a two-wheeled vehicle involves counter-steering. Counter-steering involves the driver initially pushing the handlebar in the opposite direction of the intended turn, which causes the vehicle to lean toward the direction of the intended turn. Once the vehicle is leaning toward the direction of the intended turn, the handlebars first recenter and then stabilize in the direction of the intended turn. For example, when the driver wishes to turn to the right, they initially push the handlebar, with their right hand, toward the left, causing the vehicle to lean to the right and subsequently turn to the right, whereas when the driver wishes to turn to the left, they initially push the handlebar, with their left hand, toward the right, causing the vehicle to lean to the left and subsequently turn to the left.

Accordingly, there is believed to be a need for turn signal cancelation systems and methods that can reliably cancel a turn signal in two-wheeled vehicles and take into account the particular challenges associated with turn signal cancelation in two-wheeled vehicles, including those described above.

SUMMARY

According to an example embodiment of the present invention, a turn signal cancelation system includes a speed sensor adapted to determine a speed of a vehicle, an inertial measurement unit adapted to determine a yaw rate of the vehicle, and a controller adapted to automatically cancel a turn signal of the vehicle. The controller is adapted to determine, based on the speed of the vehicle determined by the speed sensor, a distance traveled by the vehicle after an occurrence of a predetermined operation of the vehicle and to determine, based on the yaw rate determined by the inertial measurement unit, a yaw angle traversed by the vehicle after the occurrence of the predetermined operation of the vehicle. Additionally, the controller is adapted to automatically cancel the turn signal of the vehicle upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold. Moreover, the controller is adapted to automatically cancel the turn signal of the vehicle upon the determined distance traveled by the vehicle after the occurrence of the predetermined operation of the vehicle exceeding a second distance threshold, different from the first distance threshold, independent of the determined yaw angle traversed by the vehicle after the occurrence of the predetermined operation of the vehicle.

According to an example embodiment of the present invention, a turn signal cancelation system includes a speed sensor adapted to sense a speed of a vehicle, an inertial measurement unit adapted to sense a yaw rate of the vehicle, and a controller adapted to automatically cancel a turn signal of the vehicle. The controller is adapted to determine, based on the speed of the vehicle determined by the speed sensor, a distance traveled by the vehicle after an occurrence of a predetermined operation of the vehicle and to determine, based on the yaw rate determined by the inertial measurement unit, a yaw angle traversed by the vehicle after the occurrence of the predetermined operation of the vehicle. Additionally, the controller is adapted to automatically cancel the turn signal of the vehicle upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold. Moreover, the controller is adapted to automatically cancel the turn signal of the vehicle upon the determined distance traveled by the vehicle after the occurrence of the predetermined operation of the vehicle exceeding a second distance threshold, independent of the determined yaw angle traversed by the vehicle after the occurrence of the predetermined operation of the vehicle.

According to an example embodiment of the present invention, a turn signal cancelation system includes a speed sensor adapted to sense a speed of a vehicle, an inertial measurement unit adapted to sense a yaw rate of the vehicle, and a controller adapted to automatically cancel a turn signal of the vehicle. The controller is adapted to determine, based on the speed of the vehicle determined by the speed sensor, a distance traveled by the vehicle after an occurrence of a predetermined operation of the vehicle and to determine, based on the yaw rate determined by the inertial measurement unit, a yaw angle traversed by the vehicle after the occurrence of the predetermined operation of the vehicle. Additionally, the controller is adapted to automatically cancel the turn signal of the vehicle upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold.

According to an example embodiment of the present invention, a turn signal cancelation method includes: determining a speed of a vehicle; determining a yaw rate of the vehicle; determining a distance traveled by the vehicle after an occurrence of a predetermined operation of the vehicle based on the determined speed of the vehicle; determining a yaw angle traversed by the vehicle after the occurrence of the predetermined operation of the vehicle based on the determined yaw rate; automatically canceling a turn signal of the vehicle upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold; and automatically canceling the turn signal of the vehicle upon the determined distance traveled by the vehicle after the occurrence of the predetermined operation of the vehicle exceeding a second distance threshold, different from the first distance threshold, independent of the determined yaw angle traversed by the vehicle after the occurrence of the predetermined operation of the vehicle.

According to an example embodiment of the present invention, a turn signal cancelation method includes: determining a speed of a vehicle; determining a yaw rate of the vehicle; determining a distance traveled by the vehicle after an occurrence of a predetermined operation of the vehicle based on the determined speed of the vehicle; determining a yaw angle traversed by the vehicle after the occurrence of the predetermined operation of the vehicle based on the determined yaw rate; automatically canceling a turn signal of the vehicle upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold; and automatically canceling the turn signal of the vehicle upon the determined distance traveled by the vehicle after the occurrence of the predetermined operation of the vehicle exceeding a second distance threshold independent of the determined yaw angle traversed by the vehicle after the occurrence of the predetermined operation of the vehicle.

According to an example embodiment of the present invention, a turn signal cancelation method includes: determining a speed of a vehicle; determining a yaw rate of the vehicle; determining a distance traveled by the vehicle after an occurrence of a predetermined operation of the vehicle based on the determined speed of the vehicle; determining a yaw angle traversed by the vehicle after the occurrence of the predetermined operation of the vehicle based on the determined yaw rate; and automatically canceling a turn signal of the vehicle upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold According to an example embodiment of the present invention, a turn signal cancelation device for a vehicle includes a controller as described herein.

According to an example embodiment of the present invention, a vehicle includes a turn signal cancelation system as described herein.

According to an example embodiment of the present invention, a non-transitory computer readable storage medium stores a set of instructions that is executable by a processor to perform one or more of the methods described herein.

The vehicle may be arranged as a two-wheeled vehicle, e.g., a motorcycle, a motorbike, a scooter, etc.

The first predetermined threshold may be less than the second predetermined threshold.

The predetermined operation of the vehicle may include an actuation of a turn signal actuation switch to actuate a turn signal lamp of the vehicle.

The automatic cancelation of the turn signal of the vehicle may include turning off a turn signal lamp of the vehicle.

The automatic cancelation of the turn signal of the vehicle may include turning off a turn signal indicator of the vehicle.

The automatic cancelation of the turn signal of the vehicle may include resetting the turn signal actuation switch.

The yaw angle threshold may be approximately 45°, the first distance threshold may be approximately 100 meters, and the second distance threshold may be approximately 800 meters.

The speed sensor may include a wheel speed sensor adapted to sense a rotational speed of at least one wheel of the vehicle, and the controller may be adapted to determine the distance traveled by the vehicle based on the rotational speed of the at least one wheel of the vehicle.

The speed sensor is adapted to sense a rotational speed of an electric motor of the vehicle, and the controller may be adapted to determine the distance traveled by the vehicle based on the rotational speed of the electric motor.

The inertial measurement unit may include a yaw rate sensor.

The controller may be adapted to integrate the sensed speed of the vehicle over time to determine the distance traveled by the vehicle.

The controller may be adapted to integrate the sensed yaw rate of the vehicle over time to determine the yaw angle traversed by the vehicle.

The first distance threshold, the second distance threshold, and/or the yaw threshold may have predetermined fixed values.

The first distance threshold, the second distance threshold, and/or the yaw threshold may be variable.

The controller may be adapted to cancel the turn signal of the vehicle in response to manual deactuation of the turn signal actuation switch.

The controller may be adapted to determine, based on the speed of the vehicle determined by the speed sensor, a distance traveled by the vehicle after traversing the yaw angle threshold, and the controller may be adapted to automatically cancel the turn signal of the vehicle upon the determined distance traveled by the vehicle after the occurrence of the predetermined operation of the vehicle exceeding the first distance threshold, the determined yaw angle traversed by the vehicle after the occurrence of the predetermined operation of the vehicle exceeding the yaw angle threshold, and the determined distance traveled by the vehicle after traversing the yaw angle threshold exceeding a third distance threshold Further features and aspects of example embodiments of the present invention are described in more detail below with reference to the appended schematic Figures.

DETAILED DESCRIPTION

Figure 1:
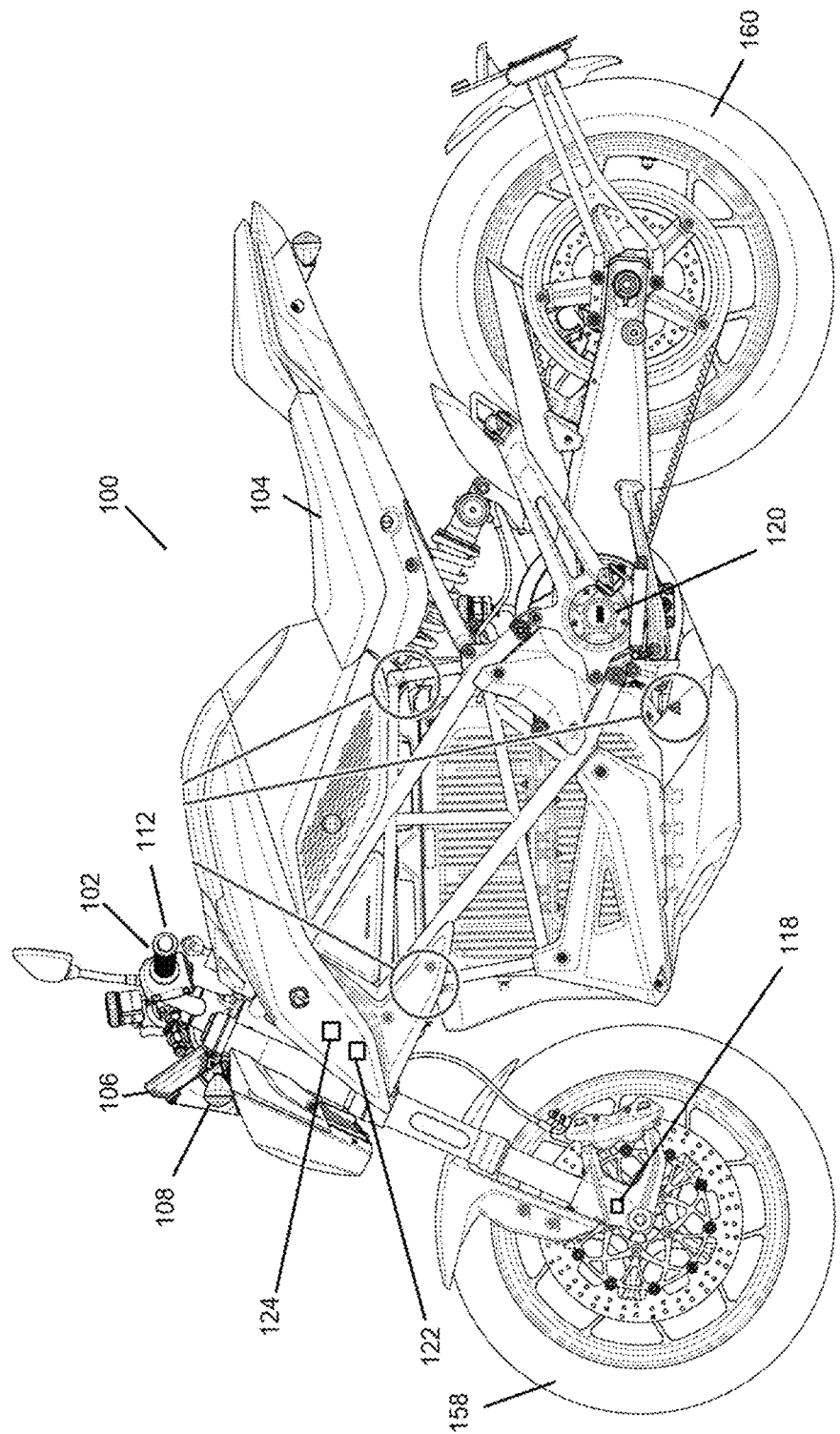
FIG. 1 is a schematic side view of a two-wheeled vehicle that includes a turn signal cancelation device according to an example embodiment of the present invention motorcycle.
Figure 2:
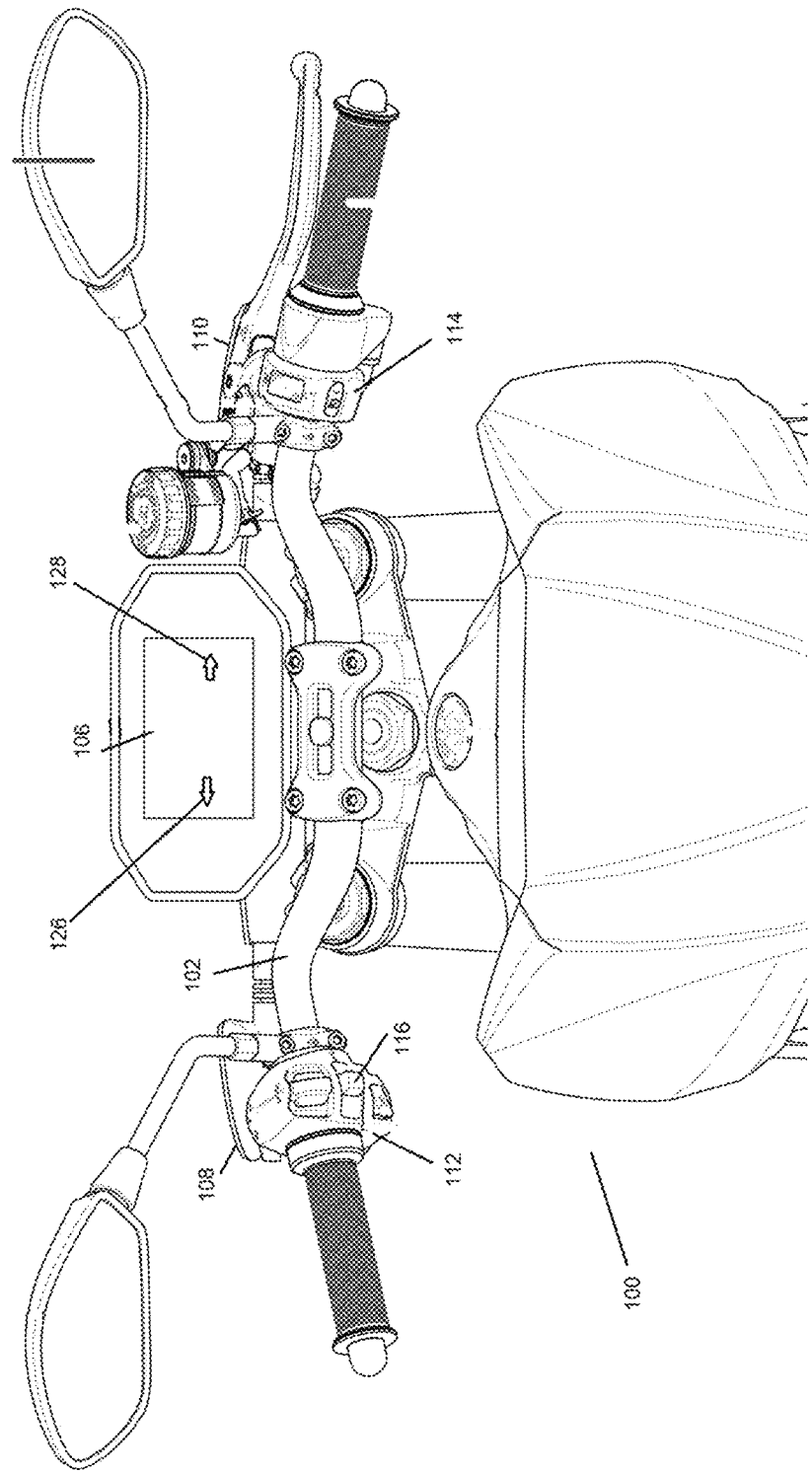
FIG. 2 is a schematic front view of the handlebar controls of the two-wheeled vehicle illustrated in FIG. 1.
Figure 3:
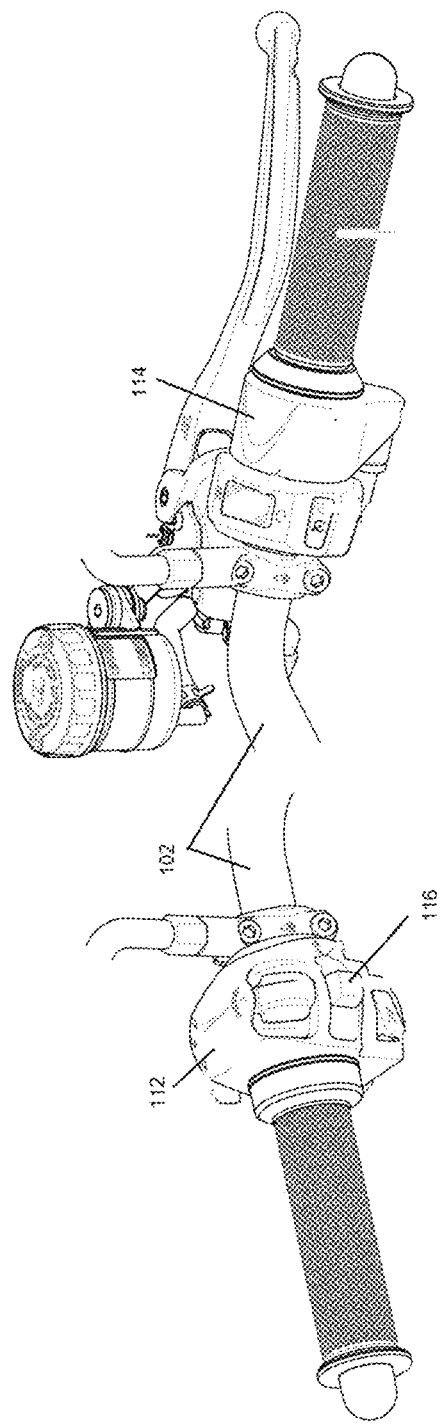
FIG. 3 is a schematic enlarged view of the handlebar controls of the two-wheeled vehicle illustrated in FIG. 1.
Figure 4:
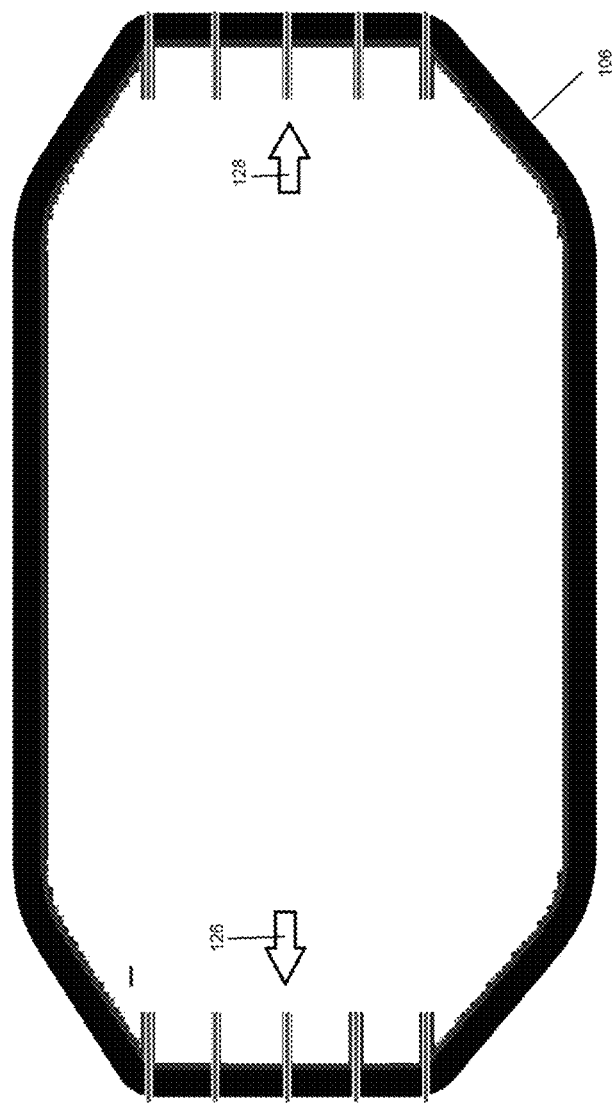
FIG. 4 is a schematic front view of the dashboard display of the two-wheeled vehicle illustrated in FIG. 1.

FIG. 1 is a schematic side view of a two-wheeled vehicle 100, FIG. 2 is a schematic front view of the handlebar controls of the vehicle 100, and FIG. 3 is an enlarged front view of the handlebar controls of the vehicle 100. The vehicle 100 includes a handlebar 102 to steer the vehicle 100 having controls 112 on the left-hand side of the handlebar 102 and controls 114 on the right-hand side of the handlebar 102. The vehicle 100 also includes a seat 104 to accommodate the driver and, optionally, a passenger.

The vehicle 100 includes two turn signal lamps 108, 110, one on the left-hand side, and the other on the right-hand side, respectively. The controls 112 on the left-hand side of the handlebar 102 include a turn signal indicator switch 116, which can be operated by the driver of the vehicle 100 to indicate the driver's intention to perform a right- or left-hand turn, for example, at an intersection, or to indicate the driver's intention to, for example, change lanes on a multi-lane road.

Specifically, to indicate the intention to perform a right-hand turn, or change lanes to a rightward lane, the driver can operate the turn signal indicator switch 116 to switch on the right-hand turn signal lamp 110, and to indicate the intention to perform a left-hand turn, or change lanes to a leftward lane, the driver can operate the turn signal indicator switch 116 to switch on the left-hand turn signal lamp 108. Once the turn or lane change is completed, the operator can manually return to the turn signal actuator switch 116 to its neutral or rest position to cancel the turn signal and turn off the turn signal lamp 108, 110.

The vehicle 100 may include a display 106 to provide the driver of the vehicle 100 with operational status, data, and messages pertaining to the operation of the vehicle 100. The display 106 may include indicators 126, 128 that provide a visual indication to the driver that the left-hand signal lamp 108 or right-hand signal lamp 110, respectively, is activated and blinking. That is, when the driver operates the turn signal indicator switch 116 to indicate the intention to perform a left-hand turn, or change lanes to a leftward lane, the left-hand turn signal lamp 108 is activated, to alert pedestrians, other drivers, etc., of the driver's intentions, and the left-hand indicator 126 is also activated to alert the driver that the left-hand turn signal lamp 108 is activated. Similarly, when the driver operates the turn signal indicator switch 116 to indicate the intention to perform a right-hand turn, or change lanes to a rightward lane, the right-hand turn signal lamp 110 is activated, to alert pedestrians, other drivers, etc., of the driver's intentions, and the right-hand indicator 128 is also activated to alert the driver that the right-hand turn signal lamp 110 is activated. The indicators 126, 128 may provide visual, audible, and/or tactile indications to the driver that the respective turn signal lamp 108, 110. For example, a visual indication may include a blinking lamp or flashing icon, e.g., in the form of an arrow, on the display 106, an audible indication may include a periodic sound, e.g., a beep, buzz, click, etc., and a tactile indication may include a periodic vibration or mechanical click, which the driver may feel through the handlebar 102.

The vehicle 100 includes a vehicle controller 124, which may include one or more electronic control units (ECUs), microprocessors, memory units (e.g., non-volatile memory units, volatile memory units, firmware, and/or non-transitory storage devices) adapted to store data and control instructions and/or software for operation of the vehicle 100, other hardware or logic circuitry, etc. The vehicle controller 124 may be arranged as a single, integrated unit, or it may be arranged as a plurality of sub-units distributed throughout the vehicle 100. The vehicle 100 further includes a wheel speed sensor 118, an motor or engine speed sensor 120, and an inertial measurement unit 122, each of which is connected to the vehicle controller 124 via respective wiring harnesses. The turn signal actuator switch 116, the turn signal lamps 108, 110, the display 106, the turn signal indicators 126, 128, etc., are also connected to the vehicle controller 124. The wheel speed sensor 118 may be provided at one of the wheels, e.g., the front wheel 158, of the vehicle 100 or may be provided at both the front wheel 158 and the rear wheel 160 of the vehicle.

The wheel speed sensor 118 may be dedicated to the turn signal cancelation feature of the vehicle 100 or may be included in the vehicle 100 related to other operational features, such as an anti-lock brake system (ABS), traction control system (TCS), electronic stability control (ESC) system, etc. The wheel speed sensor 118 may include a slotted disk, or magnetic pulse ring, and an optical or magnetic sensor to detect the rotational speed of the wheel(s) 158, 160 by detecting the slots of the slotting disk or the magnets of the magnetic pulse ring. Additionally, or alternatively, the wheel speed sensor 118 may be connected to the speedometer cable of the vehicle 100. The wheel speed sensor 118 may be constructed and configured as described, for example, in U.S. Pat. Nos. 9,145,028; 10,488,427; 10,500,897; and 10,717,323, each of which is expressly incorporated herein in its entity by reference thereto. The speed of the vehicle 100 may determined as a function of signals from the wheel speed sensor 118.

The vehicle 100 may be arranged as a motorcycle driven by an internal combustion engine, an electric motor, or a hybrid powertrain. In the case of an internal combustion engine as the source of propulsion of the vehicle 100, the motor or engine speed sensor 120 is adapted to sense the rotational speed of the internal combustion engine, or other drivetrain component(s), of the vehicle 100; in the case of an electric motor as the source of propulsion of the vehicle 100, the motor or engine speed sensor 120 is adapted to sense the rotational speed of the electric motor, or other drivetrain component(s), of the vehicle 100; and in the case of a hybrid powertrain as the source of propulsion of the vehicle 100, the motor or engine speed sensor 120 is adapted to sense the rotational speed of the electric motor, the internal combustion engine, other drivetrain component(s), of the vehicle 100. The motor or engine speed sensor 120 may be configured as a transmission speed sensor. The speed of the vehicle may be determined as a function of signals from the motor or engine speed sensor 120.

While the vehicle 100 is described as including a wheel speed sensor 118 and a motor or engine speed sensor 120, it is possible that the vehicle 100 includes one, but not both, of the wheel speed sensor 118 and the motor or engine speed sensor 120. Moreover, while the vehicle 100 may include both a wheel speed sensor 118 and a motor or engine speed sensor 120, the turn signal cancelation device 156 may only utilize signals from one, but not both, of the wheel speed sensor 118 and the motor or engine speed sensor 120. Additionally, the turn signal cancelation device 156 may utilize distance measurements derived from a GPS or other navigation system.

The inertial measurement unit 122 may include a yaw rate sensor and/or may be adapted to measure yaw rate of the vehicle 100. The inertial measurement unit 122 may be dedicated to the turn signal cancelation feature of the vehicle 100 or may be included in the vehicle 100 related to other operational features, such as, an anti-lock brake system (ABS), traction control system (TCS), electronic stability control (ESC) system, etc. The inertial measurement unit 122 may be based on MEMS (microelectromechanical systems) technology and may be constructed and configured as described, for example, in U.S. Pat. Nos. 10,809,063; 10,753,743; 9,689,676; and 9,372,097, each of which is expressly incorporated herein in its entirety by reference thereto. Examples of inertial sensors that may be included in the inertial measurement unit 122 include those of Robert Bosch GmbH, designated as SMI700, SMI710, SMI800, SMI810, and SMI860.

Figure 5:
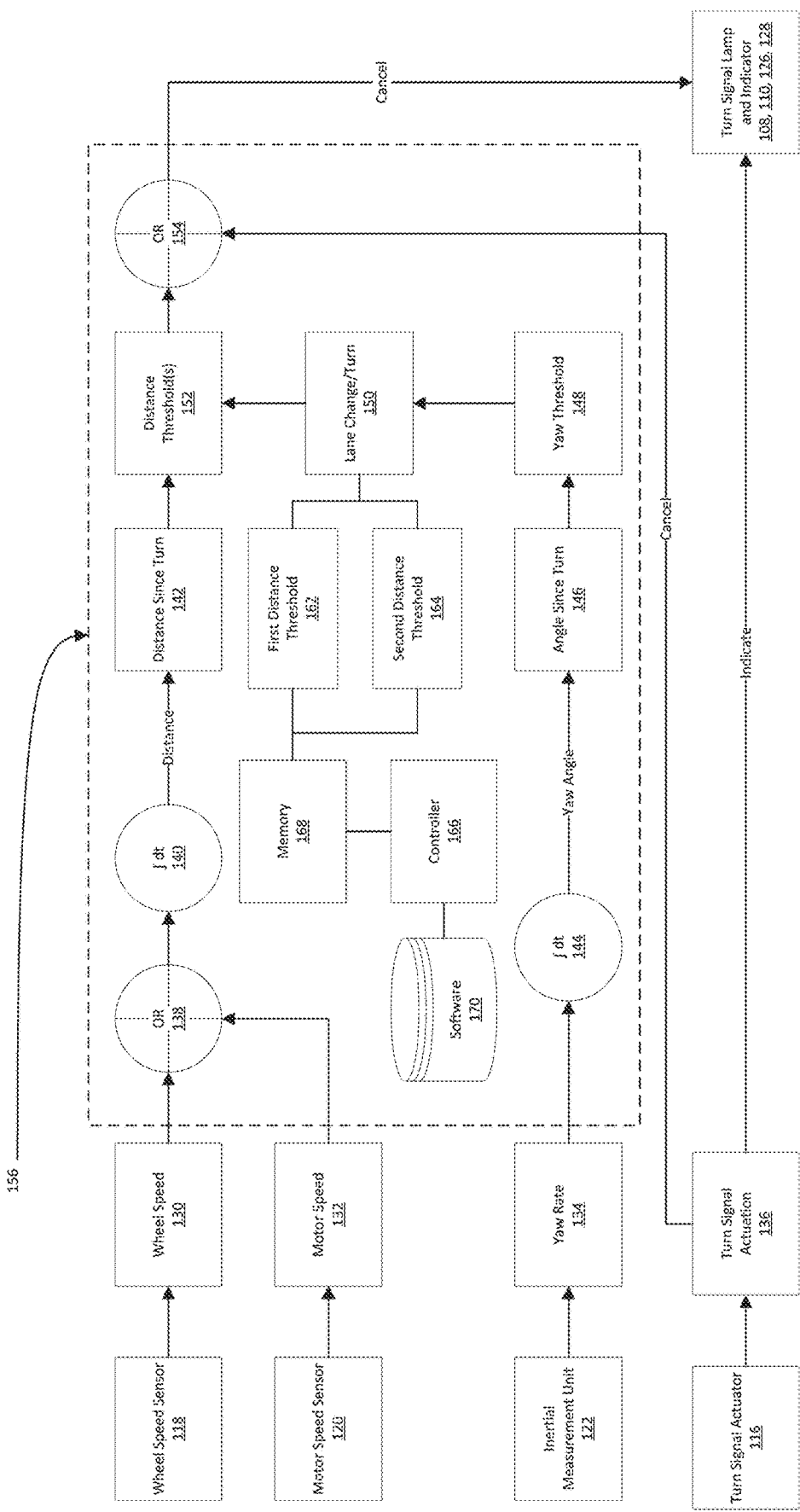
FIG. 5 is a schematic diagram illustrating the control components of the turn signal cancelation device.

FIG. 5 schematically illustrates the control components of the turn signal cancelation device 156 of the vehicle 100. Any or all of the components of the turn signal cancelation device 156 may be included in the vehicle controller 124, or the vehicle controller 124 may include the functionality of the turn signal cancelation device 156.

The wheel speed sensor 118 provides a wheel speed signal 130 to the turn signal cancelation device 156, and the motor or engine speed sensor 120 provides a motor or engine speed signal 132 to the turn signal cancelation device 156. As noted above, the turn signal cancelation device 156 may rely on signals from both of or only one of the wheel speed sensor 118 and the motor or engine speed sensor 120. Thus, as illustrated in FIG. 5, the turn signal cancelation device 156 may utilize both wheel speed signals 130 and motor speed signals 132, subject to an OR operation 138, or may utilize wheel speed signals 130 or motor speed signals 132. Moreover, as noted above, the turn signal cancelation device 156 may rely on signals from a GPS device or other navigation system to determine speed and/or distance traveled by the vehicle 100.

The inertial measurement unit 122 provides a yaw rate signal 134 to the turn signal cancelation device 156, and the turn signal actuator switch 116 provides a turn signal actuation signal 136 to the turn signal cancelation device 156. The turn signal cancelation device 156 begins its evaluation of when, and whether, to cancel the turn signal and turn off the turn signal lamp 108, 110 and the associated turn signal indicator 126, 128 in response to receiving the turn signal actuation signal 136 based on actuation of the turn signal actuator switch 116. That is, when the driver actuates the turn signal actuator switch 116 to indicate their intention to perform a turn, e.g., at an intersection, or a lane change, either the left-hand turn signal lamp 108 and left-hand turn signal indicator 126 are actuated or the right-hand turn signal lamp 110 and right-hand turn signal indicator 128 are actuated, and the turn signal cancelation device 156 begins its evaluation of when, and whether, to cancel the turn signal.

In response to receiving the turn signal actuation signal 136, the turn signal cancelation device 156 begins its determination of distance traveled by the vehicle 100 since the driver initiated the turn or lane change and begins its determination of yaw angle, in the direction of the intended turn, traversed since the driver initiated the turn or lane change. More specifically, in response to receiving the turn signal actuation signal 136, the turn signal cancelation device 156 begins its determination of distance traveled by the vehicle 100 since the driver actuated the turn signal actuator switch 116 to signal their intention to turn or change lanes and begins its determination of yaw angle traversed since the driver actuated the turn signal actuator switch 116 to signal their intention to turn or change lanes. Thus, the actuation of the turn signal actuator switch 116 represents a predetermined operation of the vehicle 100 that triggers the turn signal cancelation device 156 to evaluate when, and whether, to cancel the turn signal.

For example, in response to receiving the turn signal actuation signal 136, the turn signal cancelation device 156 integrates the wheel speed signal 130 or the motor or engine speed signal 132 over time to determine the distance 142 traveled by the vehicle 100 from the moment that the driver actuated the turn signal actuator switch 116. The turn signal cancelation device 156 may include an integrator 140, implemented in hardware, software, or a combination thereof, adapted to perform the integration of the wheel speed signal 130 or the motor or engine speed signal 132. Instead of integrating the wheel speed signal 130 or the motor or engine speed signal 132, the turn signal cancelation device 156 may determine the distance 142 traveled by the vehicle 100 from the moment that the driver actuated the turn signal actuator switch 116 based on distance signals from a GPS system or other navigation device. While actual distance traveled by the vehicle 100 may be determined and evaluated, it is also possible that a value indicative of or proportional to the distance traveled by the vehicle 100 is determined and evaluated. Similarly, while actual speed of the vehicle 100 may be determined in order to determine the distance traveled by the vehicle 100, it is possible that a value indicative or proportional to the vehicle speed may be determined and evaluated to determine the distance traveled by the vehicle 100 or a value indicative of or proportional do the distance traveled by the vehicle 100.

For example, speed of the vehicle 100 may be determined based on the rotational speed of the wheel(s) 158, 160 and the diameter, radius, or circumference of the wheel(s) 158, 160. In a vehicle 100 that includes a multi-gear transmission, the speed of the vehicle 100 may be determined based on the rotational speed of the engine or motor and the gear ratio of the engaged gear. In driveshaft-driven vehicles, the speed of the vehicle 100 may be determined based on the rotational speed of the driveshaft, the final gear ratio, etc. In vehicles that do not include a multi-gear transmission, e.g., an electric motorcycle, the speed of the vehicle 100 may be derived from the rotational speed of the electric motor.

Additionally, for example, in response to receiving the turn signal actuation signal 136, the turn signal cancelation device 156 integrates the yaw rate signal 134 over time to determine the yaw angle 146 traversed by the vehicle 100 from the moment that the driver actuators the turn signal actuator 116. The turn signal cancelation device 156 may include an integrator 144, implemented in hardware, software, or a combination thereof, adapted to perform the integration of the yaw rate signal 134.

The turn signal cancelation device 156 may store a number of thresholds in its memory 168, either as fixed values or as variable values, and/or may be programmed, via hardware, software, a combination thereof, etc., or adapted to compare acquired or determined data to one or more thresholds. For example, the turn signal cancelation device 156 may store a yaw threshold 148 and one or more distance thresholds 152 and/or may be programmed to compare acquired or determined values against these thresholds. The turn signal cancelation system 156 may perform an evaluation of whether the driver of the vehicle 100 is making a turn at, for example, an intersection or whether the driver of the vehicle 100 is changing lanes by evaluating the yaw angle 146 traversed from the moment that the turn signal actuator switch 116 is actuated by comparing the yaw angle 146 to the yaw angle threshold 148. If the yaw angle 146 is greater than the yaw angle threshold 148, the turn signal cancelation device 156 determines that the driver of the vehicle 100 is making a turn at, for example, an intersection, whereas if the yaw angle 146 does not exceed the yaw angle threshold 148, the turn signal cancelation device 156 determines that the driver of the vehicle 100 is not performing a turn at, for example, an intersection, or is performing a lane change. The yaw angle threshold 148 may be, for example, 45°. Thus, for example, the turn signal cancelation device 156 may determine that the vehicle 100 is making a turn at an intersection if it traverses a yaw angle greater than, or greater than or equal to, 45° from the moment that the turn signal actuator switch 116 is actuated and may determine that the vehicle 100 is not making a turn at an intersection or is performing a lane change if the vehicle 100 traverses a yaw angle less than, less than or equal to, or not greater than, 45° from the moment that the turn signal actuator switch 116 is actuated. While actual yaw angle traversed by the vehicle 100 may be determined and evaluated, it is also possible that a value indicative of or proportional to the yaw angle traversed by the vehicle 100 is determined and evaluated.

Based on or in response to the determination as to whether the vehicle 100 is turning at an intersection or is making a lane change, the turn signal cancelation device 156 may select between two or among multiple distance thresholds. For example, based on or in response to the determination that the vehicle 100 is turning at an intersection, e.g., based on or in response to the comparison of the yaw angle 146 to the yaw angle threshold 148, the turn signal cancelation device 156 may select, or utilize, a first distance threshold 162, and based on or in response to the determination that the vehicle 100 is changing lanes or not turning at an intersection, e.g., based on or in response to the comparison of the yaw angle 146 to the yaw angle threshold 148, the turn signal cancelation device 156 may select, or utilize, a second distance threshold 164. The first distance threshold 162 may be, for example, 100 meters, and the second distance threshold 164 may be, for example, 800 meters. Based on the selection 150 of the appropriate distance threshold 152, the turn signal cancelation device 156 compares the distance 142 traveled by the vehicle 100 from the moment that the driver actuated the turn signal actuator switch 116 to the selected distance threshold 152. If the distance 142 traveled by the vehicle 100 from the moment that the driver actuated the turn signal actuator switch 116 exceeds the selected distance threshold 152, the turn signal cancelation device 156 cancels the turn signal, causing the turn signal lamp 108, 110 and turn signal indicator 126, 128 to turn off. If, on the other hand, the distance 142 traveled by the vehicle 100 from the moment that the driver actuated the turn signal actuator switch 116 does not exceed the selected distance threshold 152, the turn signal cancelation device 156 does not cancel the turn signal, allowing the turn signal lamp 108, 110 and turn signal indicator 126, 128 to remain actuated. At all times during operation of the vehicle 100, the driver has the option to manually cancel the turn signal. In other words, the turn signal is canceled either automatically by the turn signal cancelation device 156 OR 154 manually by the driver. The turn signal cancelation device 156 may be adapted to cancel the turn signal by receiving an appropriate signal from the turn signal actuator switch 116, e.g., by the driver returning the turn signal actuator switch 116 to its rest or neutral position. Additionally, in the event that the turn signal cancelation device 156 automatically cancels the turn signal, e.g., based on the comparison of the yaw angle 146 and the yaw angle threshold 148 and the comparison of the distance 142 and the distance threshold(s) 152, 162, 164, the turn signal cancelation device 156 may cause the turn signal actuator switch 116 to return to its rest or neutral position. That is, the turn signal actuator switch 116 may be arranged as a remote reset switch, which may be reset to its rest or neutral position, i.e., an OFF position, by application of a specified voltage on its reset coil.

It should be appreciated that the controller 166 may include processor(s), microprocessor(s), other logic unit(s), circuitry, hardware, software, and/or firmware for performing and controlling the operations of the turn signal cancelation device 156. It is also possible that the turn signal cancelation device 156 may be implemented utilizing analog circuitry. For example, the turn signal cancelation device 156 may include an integrator circuit to integrate analog signals from the wheel speed sensor 118 and/or the motor or engine speed sensor to obtain the distance 142. Similarly, the turn signal cancelation device 156 may include an integrator circuit to integrate analog signals from the inertial measurement unit 122 to obtain the yaw angle 146. The comparison of the distance 142 and yaw angle 146 to respective thresholds 148, 152, 162, 164 may be performed by comparator circuit(s).

Figure 6:
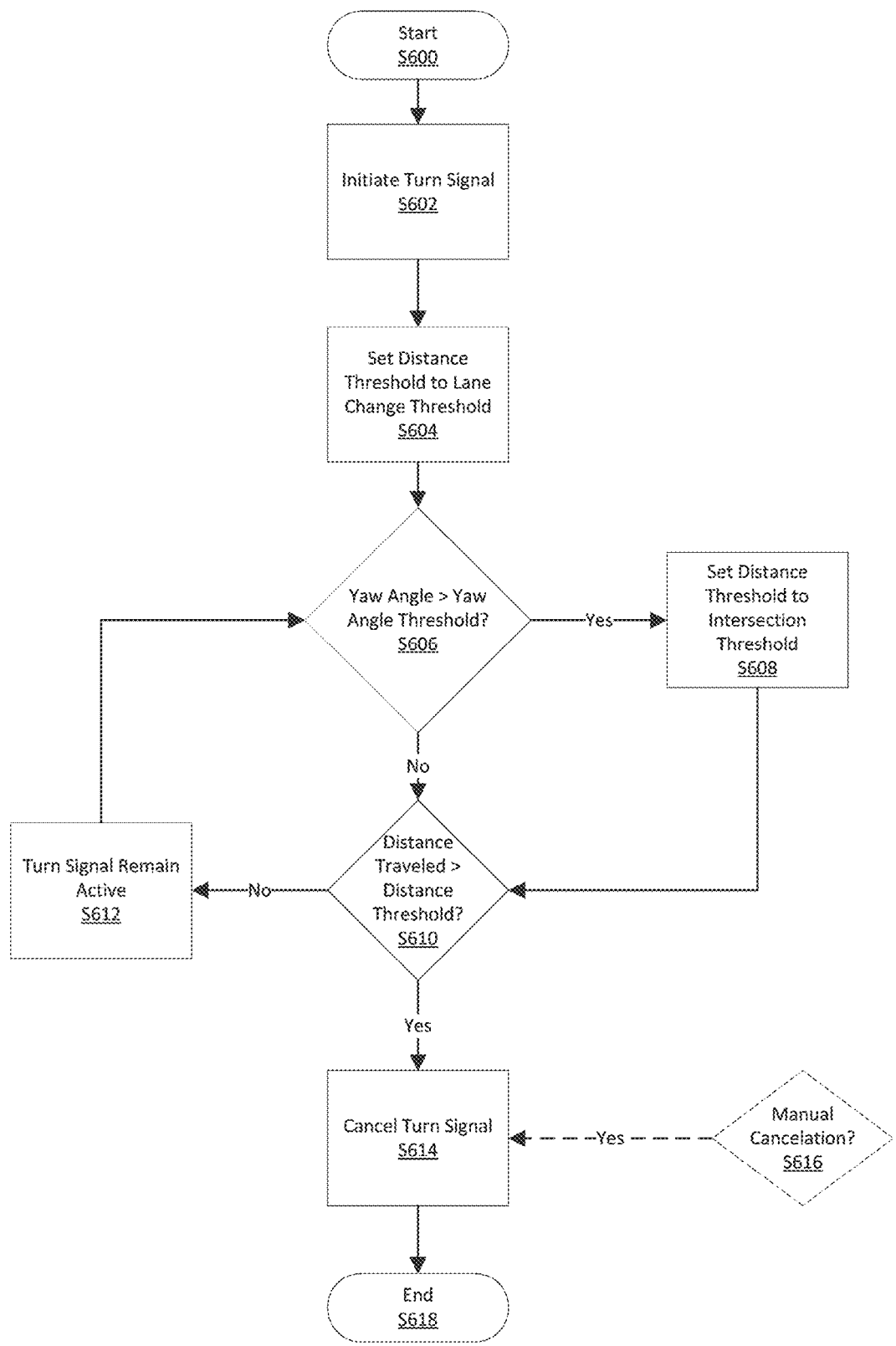
FIG. 6 is a schematic flow chart illustrating a turn signal cancelation method according to an example embodiment of the present invention.

FIG. 6 is a schematic flow chart illustrating a turn signal cancelation method according to an example embodiment of the present invention. As illustrated in FIG. 6, the method starts at S600.

When the driver operates the turn signal actuator switch 116 of the vehicle 100, at S602, either the left-hand turn signal 108 and the left-hand turn signal indicator 126 are activated, e.g., to blink, in the circumstance that the turn signal actuator switch 116 is switched to the LEFT position, or the right-hand turn signal 110 and the right-hand turn signal indicator 128 are activated, e.g., to blink, in the circumstance that the turn signal actuator switch 116 is switched to the RIGHT position.

At S604, a distance threshold $D_T$ is set to the lane change threshold, e.g., second distance threshold 164, which, as mentioned above, may be, e.g., 800 meters.

At S606, the yaw angle $\psi$ traversed by the vehicle 100 from the moment that the turn signal is initiated, i.e., since S602, is compared to a yaw angle threshold $\psi_T$, e.g., yaw angle threshold 148, which, as mentioned above, may be, for example, 45°. In the circumstance that yaw angle $\psi$ is less than, less than or equal to, or not greater than yaw angle threshold $\psi_T$ (e.g., $\psi<\psi_T$, $\psi\leq\psi_T$, or $\psi\not>\psi_T$), it is determined that the vehicle 100 is not turning at an intersection, or has not yet turned sufficiently to indicate that the driver is turning at an intersection, and the process proceeds to S610. In this circumstance, the distance threshold $D_T$ remains unchanged at the lane change threshold.

In the circumstance that the yaw angle $\Psi$ reaches, exceeds, or is not below the yaw angle threshold $\psi_T$, i.e., yaw angle $\psi$ is greater than, greater than or equal to, or not less than yaw angle threshold $\psi_T$ (e.g., $\psi>\psi_T$, $\psi\geq\Psi_T$, or $\psi\not<\psi_T$), it is determined that the vehicle 100 is turning at an intersection, and the distance threshold $D_T$ is changed to the intersection threshold, at S608, e.g., the first distance threshold 162, which, as mentioned above, may be, for example, 100 meters.

At S610, the distance D traveled by the vehicle 100 from the moment that the turn signal is initiated, i.e., since S602, is compared to distance threshold $D_T$.

In the circumstance that the distance D is less than, less than or equal to, or not greater than the distance threshold $D_T$ (e.g., $D<D_T$, $D\leq D_T$, or $D\not>D_T$), it is determined that the turn signal 108, 110 and turn signal indicator 126, 128 should remain active, since the vehicle 100 has not traveled sufficient distance to warrant cancelation of the turn signal. Accordingly, at S612, the turn signal lamp 108, 110 and turn signal indicator 126, 128 remain active, e.g., continue to blink, and the process returns to S606. It is possible that the process does not perform the comparison at S606 in the event, for example, that it is determined that the yaw angle $\psi$ exceeds the yaw angle threshold $\Psi_T$. That is, once it is determined that the vehicle 100 is making a turn at an intersection, the turn signal cancelation device 156 may dispense with further evaluation of the yaw angle $\psi$.

In the circumstance that the distance D is greater than, greater than or equal to, or not less than the distance threshold $D_T$ (e.g., $D>D_T$, $D\geq D_T$, or $D\not<D_T$), it is determined that the vehicle 100 has traveled a sufficient distance since the moment that the turn signal is initiated, i.e., since S602, that the turn signal should be canceled and that turn signal lamp 108, 110 and turn signal indicator 126, 128 should be turned OFF. Thus, at S614, the turn signal lamp 108, 110 is turned OFF, the turn signal indicator 126, 128 is turned OFF, and the turn signal actuator switch 116 is returned to its rest or neutral position, e.g., the OFF position, if equipped with a reset feature.

At S616, it is determined whether the driver manually cancels the turn signal, in which the process proceeds to S614, and, as described above, the turn signal lamp 108, 110 is turned OFF, the turn signal indicator 126, 128 is turned OFF, and the turn signal actuator switch 116 is returned to its rest or neutral position, e.g., the OFF position, if equipped with a reset feature.

The process ends at S618 and is restarted in the event that the driver initiates another turn signal by actuating the turn signal actuator switch 116.

Figure 7:
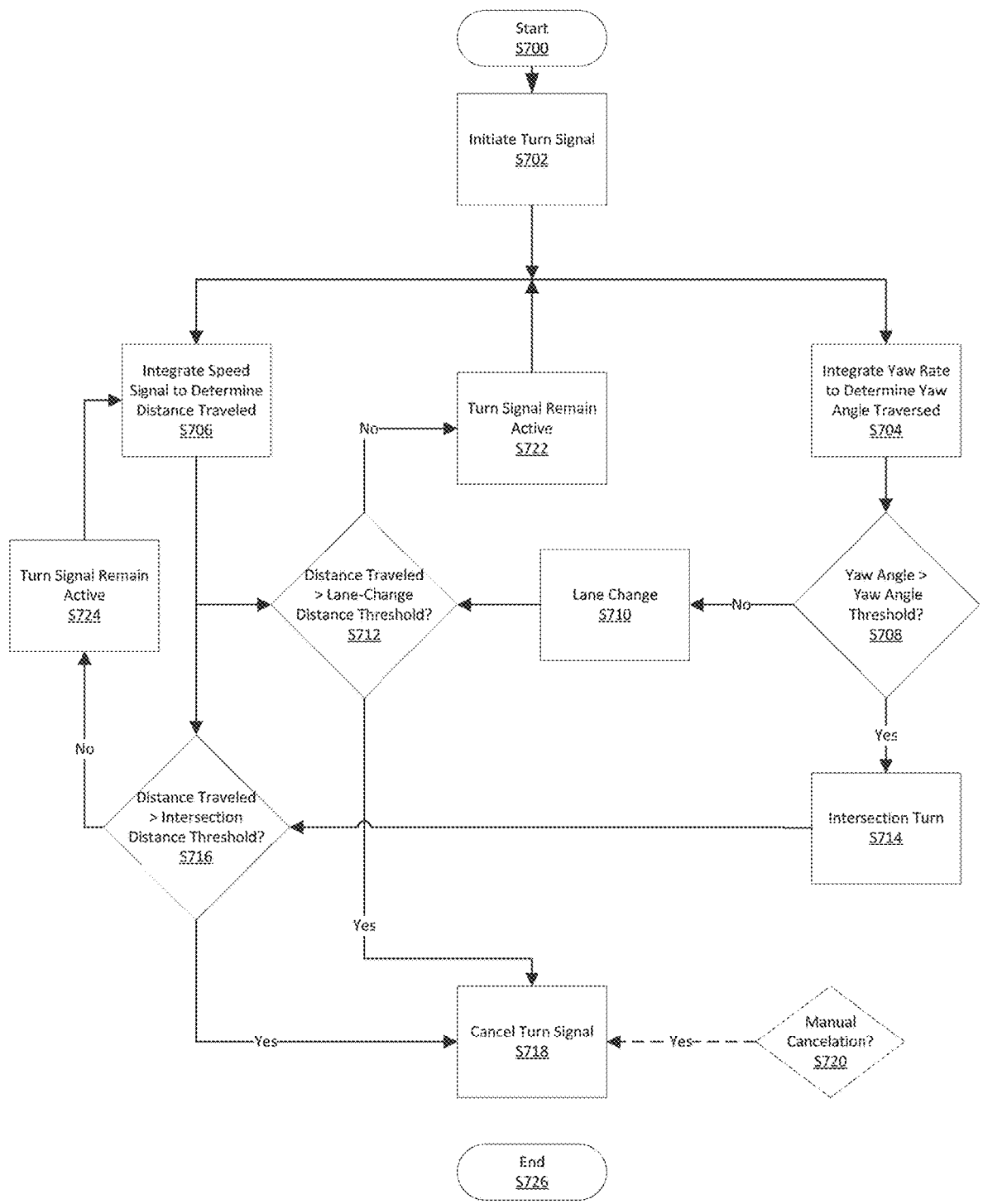
FIG. 7 is a schematic flow chart illustrating a turn signal cancelation method according to an example embodiment of the present invention.

FIG. 7 is a schematic flow chart illustrating a turn signal cancelation method according to an example embodiment of the present invention. As illustrated in FIG. 7, the method starts at S700.

When the driver operates the turn signal actuator switch 116 of the vehicle 100, at S702, either the left-hand turn signal 108 and the left-hand turn signal indicator 126 are activated, e.g., to blink, in the circumstance that the turn signal actuator switch 116 is switched to the LEFT position, or the right-hand turn signal 110 and the right-hand turn signal indicator 128 are activated, e.g., to blink, in the circumstance that the turn signal actuator switch 116 is switched to the RIGHT position.

At S704, the yaw angle rate of the vehicle 100, e.g., yaw rate signal 134 from inertial measurement unit 122, is integrated to determine the yaw angle $\psi$ traversed by the vehicle 100 from the moment that the turn signal is initiated, i.e., since S702, and at S706, the speed of the vehicle 100, e.g., wheel speed signal 130 from wheel speed sensor 118, motor or engine speed signal 132 from motor or engine speed sensor 120, is integrated to determine the distance D traveled by the vehicle 100 from the moment that the turn signal is initiated, i.e., since S702. While S704 and S706 are illustrated in FIG. 7 as being performed in parallel, S704 and S706 may be performed sequentially, in either order.

At S708, the yaw angle $\psi$ traversed by the vehicle 100 from the moment that the turn signal is initiated, i.e., since S702, is compared to a yaw angle threshold $\psi_T$, e.g., yaw angle threshold 148, which, as mentioned above, may be, for example, 45°. In the circumstance that yaw angle $\psi$ is less than, less than or equal to, or not greater than yaw angle threshold $\psi_T$ (e.g., $\psi<\psi_T$, $\psi\leq\psi_T$, or $\psi\not>\psi_T$), it is determined, e.g., at S710, that the vehicle 100 is not turning at an intersection, has not yet turned sufficiently to indicate that the driver is turning at an intersection, or is performing a lane change, and the process proceeds to S712. In the circumstance that the yaw angle $\psi$ reaches, exceeds, or is not below the yaw angle threshold $\psi_T$, i.e., yaw angle $\psi$ is greater than, greater than or equal to, or not less than yaw angle threshold $\psi_T$ (e.g., $\psi>\psi_T$, $\psi\geq\psi_T$, or $\psi\not<\psi_T$), it is determined, e.g., at S714, that the vehicle 100 is turning at an intersection, and the process proceeds to S716.

At S712, e.g., in the circumstance that the vehicle 100 is performing a lane change, the distance D traveled by the vehicle 100 from the moment that the turn signal is initiated, i.e., since S702, is compared to a lane-change distance threshold $D_{TL}$, i.e., second distance threshold 164, which, as mentioned above, may be, for example, 800 meters. In the circumstance that the distance D is less than, less than or equal to, or not greater than the lane-change distance threshold $D_{TL}$ (e.g., $D<D_{TL}$, $D\leq D_{TL}$, or $D\not>D_{TL}$), it is determined that the turn signal 108, 110 and turn signal indicator 126, 128 should remain active, since the vehicle 100 has not traveled sufficient distance to warrant cancelation of the turn signal. Accordingly, at S722, the turn signal lamp 108, 110 and turn signal indicator 126, 128 remain active, e.g., continue to blink, and the process returns to continue the integrations S704 and S706. In the circumstance that the distance D is greater than, greater than or equal to, or not less than the lane-change distance threshold $D_{TL}$ (e.g., $D>D_{TL}$, $D\geq D_{TL}$, or $D\not<D_{TL}$), it is determined that the vehicle 100 has traveled a sufficient distance since the moment that the turn signal is initiated, i.e., since S702, that the turn signal should be canceled and that turn signal lamp 108, 110 and turn signal indicator 126, 128 should be turned OFF. Thus, at S718, the turn signal lamp 108, 110 is turned OFF, the turn signal indicator 126, 128 is turned OFF, and the turn signal actuator switch 116 is returned to its rest or neutral position, e.g., the OFF position, if equipped with a reset feature.

At S716, e.g., in the circumstance that the vehicle 100 is performing an intersection turn, the distance D traveled by the vehicle 100 from the moment that the turn signal is initiated, i.e., since S702, is compared to an intersection distance threshold $D_{TT}$, i.e., first distance threshold 162, which, as mentioned above, may be, for example, 100 meters. In the circumstance that the distance D is less than, less than or equal to, or not greater than the intersection distance threshold $D_{TT}$ (e.g., $D<D_{TT}$, $D\leq D_{TT}$, or $D\not>D_{TT}$), it is determined that the turn signal 108, 110 and turn signal indicator 126, 128 should remain active, since the vehicle 100 has not traveled sufficient distance to warrant cancelation of the turn signal. Accordingly, at S724, the turn signal lamp 108, 110 and turn signal indicator 126, 128 remain active, e.g., continue to blink, and the process returns to continue the integrations S704 and S706. In the circumstance that the distance D is greater than, greater than or equal to, or not less than the intersection distance threshold $D_{TT}$ (e.g., $D>D_{TT}$, $D\geq D_{TT}$, or $D\not<D_{TT}$), it is determined that the vehicle 100 has traveled a sufficient distance since the moment that the turn signal is initiated, i.e., since S702, that the turn signal should be canceled and that turn signal lamp 108, 110 and turn signal indicator 126, 128 should be turned OFF. Thus, at S718, as mentioned above, the turn signal lamp 108, 110 is turned OFF, the turn signal indicator 126, 128 is turned OFF, and the turn signal actuator switch 116 is returned to its rest or neutral position, e.g., the OFF position, if equipped with a reset feature.

At S720, it is determined whether the driver manually cancels the turn signal, in which the process proceeds to S718, and, as described above, the turn signal lamp 108, 110 is turned OFF, the turn signal indicator 126, 128 is turned OFF, and the turn signal actuator switch 116 is returned to its rest or neutral position, e.g., the OFF position, if equipped with a reset feature.

The process ends at S726 and is restarted in the event that the driver initiates another turn signal by actuating the turn signal actuation switch 136.

The foregoing processes may be performed by a controller 166 of the turn signal cancelation device 156 and may be implanted as hardware-based processes, software-based processes, e.g., software 170. Controller 166 may be part of the vehicle controller 124 or may be arranged as a separate unit. Moreover, controller 166 may be arranged as a single unit or may be formed of multiple units distributed throughout the vehicle 100. Software 170 may be stored in a non-transitory computer readable storage medium as a set of instructions that executable by a processor. For example, the controller 166 may include microprocessor adapted to execute the set of instructions stored in the non-transitory computer readable storage medium to perform the processes described herein.

As mentioned above, the yaw angle threshold may be 45°. However, the yaw angle threshold may be approximately 45°, e.g., between 44° and 46°, 40° and 50°, 35° and 55°, etc. The yaw angle threshold may be fixed or variable, e.g., user-definable.

As mentioned above, the first distance thresholds may be 100 meters, and the second distance threshold may be 800 meters. However, the first distance threshold may be approximately 100 meters, e.g., 95 to 105 meters, 90 to 110 meters, etc., and the second distance threshold may be approximately 800 meters, e.g., 795 to 805 meters, 790 meters to 800 meters, etc. The distance thresholds may be fixed or variable, e.g., user-definable.

Additionally, the driver of the vehicle 100 may actuate the turn signal indicator switch 116 to indicate the intention to turn at, for example, an intersection a significant distance in advance of that turn. Therefore, to avoid the possibility of canceling the turn signal too soon, e.g., turning OFF the turn signal lamp 108, 110 and indicators 126, 128 after the distance threshold is reached but short of making a complete turn, the turn signal cancelation device 156 may reset the distance measurement upon reaching the yaw angle threshold, requiring the vehicle 100 to travel a predetermined distance after traversing the yaw angle threshold to cancel the turn signal. Thus, the turn signal cancelation system 156 may cancel the turn signal upon the vehicle 100: (1) traveling a predetermined distance (e.g., a first predetermined distance) from the moment that the turn signal actuator switch 116 is actuated, regardless of yaw angle traversed since that moment; (2) traveling a predetermined distance (e.g., a second predetermined distance different and/or shorter than the first predetermined distance) from the moment the turn signal actuator switch 116 is actuated and traversing a predetermined yaw angle since that moment; (3) traveling a predetermined distance from the moment the turn signal actuator switch 116 is actuated, traversing a predetermined yaw angle since that moment, and further traveling a predetermined distance from the moment the predetermined yaw angle is traversed; and/or (4) traversing a predetermined yaw angle from the moment the turn signal actuator switch 116 is actuated and traveling a predetermined distance from the moment the predetermined yaw angle is traversed, regardless of the distance traveled prior to traversing the predetermined yaw angle.

While the turn signal cancelation device 156 is particularly suitable for two-wheeled vehicles, including motorcycles, motorbikes, scooters, etc., the turn signal cancelation device 156 may be utilized in other types of vehicles, including automobiles, trucks, buses, industrial vehicles, etc. In other words, the turn signal cancelation device 156 may be included in any type of vehicle having turn signal(s).

What is claimed is:

1. A turn signal cancelation system, comprising:
a speed sensor adapted to determine a speed of a vehicle;
an inertial measurement unit adapted to determine a yaw rate of the vehicle; and
a controller adapted to automatically cancel a turn signal of the vehicle, the controller adapted to determine, based on the speed of the vehicle determined by the speed sensor, a distance traveled by the vehicle after an occurrence of a predetermined operation of the vehicle and to determine, based on the yaw rate determined by the inertial measurement unit, a yaw angle traversed by the vehicle after the occurrence of the predetermined operation of the vehicle;
wherein the controller is adapted to automatically cancel the turn signal of the vehicle, responsive to a turn by the vehicle, upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold; and
wherein the controller is adapted to automatically cancel the turn signal of the vehicle, responsive to a lane change by the vehicle, upon the determined distance traveled by the vehicle after the occurrence of the predetermined operation of the vehicle exceeding a second distance threshold, different from the first distance threshold, independent of the determined yaw angle traversed by the vehicle after the occurrence of the predetermined operation of the vehicle.

2. The system according to claim 1, wherein the vehicle is arranged as a two-wheeled vehicle.

3. The system according to claim 1, wherein the first distance threshold is less than the second distance threshold.

4. The system according to claim 1, wherein the predetermined operation of the vehicle includes actuation of a turn signal actuation switch to actuate a turn signal lamp of the vehicle.

5. The system according to claim 4, wherein the automatic cancelation of the turn signal of the vehicle includes resetting the turn signal actuation switch.

6. The system according to claim 4, wherein the controller is adapted to cancel the turn signal of the vehicle in response to manual deactuation of the turn signal actuation switch.

7. The system according to claim 1, wherein the automatic cancelation of the turn signal of the vehicle includes turning off a turn signal lamp of the vehicle.

8. The system according to claim 1, wherein the automatic cancelation of the turn signal of the vehicle includes turning off a turn signal indicator of the vehicle.

9. The system according to claim 1, wherein the speed sensor includes a wheel speed sensor adapted to sense a rotational speed of at least one wheel of the vehicle, the controller adapted to determine the distance traveled by the vehicle based on the rotational speed of the at least one wheel of the vehicle.

10. The system according to claim 1, wherein the speed sensor is adapted to sense a rotational speed of an electric motor of the vehicle, the controller adapted to determine the distance traveled by the vehicle based on the rotational speed of the electric motor.

11. The system according to claim 1, wherein the inertial measurement unit includes a yaw rate sensor.

12. The system according to claim 1, wherein the controller is adapted to integrate the sensed speed of the vehicle over time to determine the distance traveled by the vehicle.

13. The system according to claim 1, wherein the controller is adapted to integrate the sensed yaw rate of the vehicle over time to determine the yaw angle traversed by the vehicle.

14. The system according to claim 1, wherein the first distance threshold, the second distance threshold, and/or the yaw threshold have predetermined fixed values.

15. The system according to claim 1, wherein the first distance threshold, the second distance threshold, and/or the yaw threshold are variable.

16. The system according to claim 1, wherein the controller is adapted to determine, based on the speed of the vehicle determined by the speed sensor, a distance traveled by the vehicle after traversing the yaw angle threshold, the controller adapted to automatically cancel the turn signal of the vehicle upon the determined distance traveled by the vehicle after the occurrence of the predetermined operation of the vehicle exceeding the first distance threshold, the determined yaw angle traversed by the vehicle after the occurrence of the predetermined operation of the vehicle exceeding the yaw angle threshold, and the determined distance traveled by the vehicle after traversing the yaw angle threshold exceeding a third distance threshold.

17. A turn signal cancelation system, comprising:
a speed sensor adapted to determine a speed of a vehicle;
an inertial measurement unit adapted to determine a yaw rate of the vehicle; and
a controller adapted to automatically cancel a turn signal of the vehicle, the controller adapted to determine, based on the speed of the vehicle determined by the speed sensor, a distance traveled by the vehicle after an occurrence of a predetermined operation of the vehicle and to determine, based on the yaw rate determined by the inertial measurement unit, a yaw angle traversed by the vehicle after the occurrence of the predetermined operation of the vehicle;
wherein the controller is adapted to automatically cancel the turn signal of the vehicle upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold;
wherein the controller is adapted to automatically cancel the turn signal of the vehicle upon the determined distance traveled by the vehicle after the occurrence of the predetermined operation of the vehicle exceeding a second distance threshold, different from the first distance threshold, independent of the determined yaw angle traversed by the vehicle after the occurrence of the predetermined operation of the vehicle; and wherein the yaw angle threshold is approximately 45°, the first distance threshold is approximately 100 meters, and the second distance threshold is approximately 800 meters.

18. A turn signal cancelation system, comprising:

a speed sensor adapted to sense a speed of a vehicle;

an inertial measurement unit adapted to sense a yaw rate of the vehicle; and a controller adapted to automatically cancel a turn signal of the vehicle, the controller adapted to determine, based on the speed of the vehicle determined by the speed sensor, a distance traveled by the vehicle after an occurrence of a predetermined operation of the vehicle and to determine, based on the yaw rate determined by the inertial measurement unit, a yaw angle traversed by the vehicle after the occurrence of the predetermined operation of the vehicle;

wherein the controller is adapted to automatically cancel the turn signal of the vehicle, responsive to a turn by the vehicle, upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold; and wherein the controller is adapted to automatically cancel the turn signal of the vehicle, responsive to a lane change by the vehicle, upon the determined distance traveled by the vehicle after the occurrence of the predetermined operation of the vehicle exceeding a second distance threshold, independent of the determined yaw angle traversed by the vehicle after the occurrence of the predetermined operation of the vehicle.

19. A turn signal cancelation system, comprising:

a speed sensor adapted to sense a speed of a vehicle;

an inertial measurement unit adapted to sense a yaw rate of the vehicle; and a controller adapted to automatically cancel a turn signal of the vehicle, the controller adapted to determine, based on the speed of the vehicle determined by the speed sensor, a distance traveled by the vehicle after an occurrence of a predetermined operation of the vehicle and to determine, based on the yaw rate determined by the inertial measurement unit, a yaw angle traversed by the vehicle after the occurrence of the predetermined operation of the vehicle;

wherein the controller is adapted to automatically cancel the turn signal of the vehicle upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold;

wherein the automatic cancelation of the turn signal of the vehicle includes turning off a turn signal indicator of the vehicle; and wherein the speed sensor is adapted to sense a rotational speed of an electric motor of the vehicle, the controller adapted to determine the distance traveled by the vehicle based on the rotational speed of the electric motor.

20. The system according to claim 19, wherein the controller is adapted to automatically cancel the turn signal of the vehicle upon the determined distance traveled by the vehicle after the occurrence of the predetermined operation of the vehicle exceeding a second distance threshold, independent of the determined yaw angle traversed by the vehicle after the occurrence of the predetermined operation of the vehicle, the second distance threshold being greater than the first distance threshold.

21. A turn signal cancelation method, comprising:

determining a speed of a vehicle;

determining a yaw rate of the vehicle;

determining a distance traveled by the vehicle after an occurrence of a predetermined operation of the vehicle based on the determined speed of the vehicle;

determining a yaw angle traversed by the vehicle after the occurrence of the predetermined operation of the vehicle based on the determined yaw rate;

responsive to a turn by the vehicle, automatically canceling a turn signal of the vehicle upon the determined distance traveled by the vehicle after the occurrence of the predetermined operation of the vehicle exceeding a first distance threshold and the determined yaw angle traversed by the vehicle after the occurrence of the predetermined operation of the vehicle exceeding a yaw angle threshold; and responsive to a lane change by the vehicle, automatically canceling the turn signal of the vehicle upon the determined distance traveled by the vehicle after the occurrence of the predetermined operation of the vehicle exceeding a second distance threshold, different from the first distance threshold, independent of the determined yaw angle traversed by the vehicle after the occurrence of the predetermined operation of the vehicle.

* * * * *